(12) United States Patent
Tong et al.

(10) Patent No.: US 11,875,548 B2
(45) Date of Patent: Jan. 16, 2024

(54) SYSTEM AND METHOD FOR REGION OF INTEREST WINDOW GENERATION FOR ATTENTION BASED PERCEPTION

(71) Applicant: GM GLOBAL TECHNOLOGY OPERATIONS LLC, Detroit, MI (US)

(72) Inventors: Wei Tong, Troy, MI (US); Shige Wang, Northville, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 17/382,459

(22) Filed: Jul. 22, 2021

(65) Prior Publication Data

US 2023/0027275 A1    Jan. 26, 2023

(51) Int. Cl.
*G06V 10/25* (2022.01)
*G01S 17/89* (2020.01)
*G01S 17/931* (2020.01)
*B60W 60/00* (2020.01)
*B60W 40/06* (2012.01)
*B60W 50/14* (2020.01)
*G06V 20/58* (2022.01)

(52) U.S. Cl.
CPC ............ *G06V 10/25* (2022.01); *B60W 40/06* (2013.01); *B60W 50/14* (2013.01); *B60W 60/0011* (2020.02); *G01S 17/89* (2013.01); *G01S 17/931* (2020.01); *G06V 20/58* (2022.01); *B60W 2554/4041* (2020.02); *B60W 2554/4046* (2020.02); *B60W 2556/40* (2020.02)

(58) Field of Classification Search
CPC .. B60W 40/06; B60W 50/14; B60W 60/0011; B60W 2554/4041; B60W 2554/4046; B60W 2556/40; B60W 2050/143; B60W 2420/42; G01S 17/89; G01S 17/931; G01S 17/86; G06V 20/58
USPC ......................................................... 382/104
See application file for complete search history.

(56) References Cited

U.S. PATENT DOCUMENTS 10,007,269 B1 *   6/2018   Gray .................... G06F 18/2415
10,324,463 B1 *   6/2019   Konrardy ............. G05D 1/0278
(Continued)

FOREIGN PATENT DOCUMENTS

CA        2739989 A1 *  4/2010  ........... G01S 17/023
CA        3067177 A1 *  8/2016  ............ B60W 30/10
(Continued)

*Primary Examiner* — Mahendra R Patel
(74) *Attorney, Agent, or Firm* — Quinn IP Law

(57) ABSTRACT

A system for an attention-based perception includes a camera device configured to provide an image of an operating environment of a vehicle. The system further includes a computerized device monitoring the image, analyzing sensor data to identify a feature in the image as corresponding to an object in the operating environment and assign a score for the feature based upon an identification, a location, or a behavior of the object. The computerized device is further operable to define candidate regions of interest upon the image, correlate the score for the feature to the candidate regions of interest to accrue a total region score, select some of the candidate regions for analysis based upon the total region scores, and analyze the portion of the candidate regions to generate a path of travel output. The system further includes a device controlling the vehicle based upon the output.

20 Claims, 6 Drawing Sheets

(56) References Cited

U.S. PATENT DOCUMENTS

| | | | | |
|---|---|---|---|---|
| 10,816,939 B1* | 10/2020 | Coleman | ............... | G01S 17/86 |
| 11,069,082 B1* | 7/2021 | Ebrahimi Afrouzi | .. | H04N 23/56 |
| 11,537,811 B2* | 12/2022 | Shen | ............... | G05D 1/0251 |
| 11,613,261 B2* | 3/2023 | Raichelgauz | .......... | G06N 20/00 |
| | | | | 340/576 |
| 11,645,779 B1* | 5/2023 | Pertsel | ............... | G05D 1/0088 |
| | | | | 382/104 |
| 11,676,364 B2* | 6/2023 | Xu | .................. | G06V 10/82 |
| | | | | 382/104 |
| 11,731,618 B2* | 8/2023 | Penilla | ................ | G08G 1/0112 |
| | | | | 701/41 |
| 2018/0093663 A1* | 4/2018 | Kim | ............... | G08G 1/166 |
| 2018/0143639 A1* | 5/2018 | Singhal | ............... | G08G 1/165 |
| 2018/0201138 A1* | 7/2018 | Yellambalase | .......... | B60L 53/16 |
| 2019/0113916 A1* | 4/2019 | Guo | ............... | B60K 28/02 |
| 2019/0180502 A1* | 6/2019 | Englard | ............... | G01S 7/417 |
| 2019/0250622 A1* | 8/2019 | Nister | ............... | B60W 60/0027 |
| 2019/0329729 A1* | 10/2019 | Hilligardt | ............... | B60R 21/34 |
| 2019/0383631 A1* | 12/2019 | Bigio | ............... | G06V 20/59 |
| 2020/0284883 A1* | 9/2020 | Ferreira | ............... | G01S 7/4816 |
| 2021/0155157 A1* | 5/2021 | Godsey | ............... | B60Q 9/005 |

FOREIGN PATENT DOCUMENTS

| | | | | |
|---|---|---|---|---|
| CN | 110291477 A | * | 9/2019 | ............ B60W 10/18 |
| CN | 110427797 A | * | 11/2019 | |
| CN | 110573978 A | * | 12/2019 | .......... B60W 50/023 |
| EP | 3654241 A1 | * | 5/2020 | ........ G06K 9/00798 |
| EP | 3809153 A1 | * | 4/2021 | ............ G01J 1/0411 |
| WO | WO-2019180700 A1 | * | 9/2019 | ............ B60W 30/16 |
| WO | WO-2019195404 A1 | * | 10/2019 | .......... B60W 60/001 |
| WO | WO-2020255748 A1 | * | 12/2020 | ............... B60T 7/22 |
| WO | WO-2021116045 A1 | * | 6/2021 | ........... G01S 13/865 |
| WO | WO-2021138616 A1 | * | 7/2021 | ............ B60W 10/04 |

* cited by examiner

SYSTEM AND METHOD FOR REGION OF INTEREST WINDOW GENERATION FOR ATTENTION BASED PERCEPTION

INTRODUCTION

The disclosure generally relates to a system and method for region of interest window generation for attention-based perception. The disclosed system may be utilized in autonomous and semi-autonomous vehicular systems.

Vehicles may utilize a computerized processor to operate programming operable to analyze sensor data and make determinations about objects within an operating environment of the vehicle. Such programming may be described as computerized perception. Efficacy of computerized perception is a function of processing capability of the computerized processor and how many computing resources may be dedicated to analyzing the sensor data.

SUMMARY

A system for an attention-based perception in a vehicle is provided. The system includes a camera device configured to provide an image of an operating environment of the vehicle. The system further includes a computerized perception device operable to monitor the image from the camera device and analyze sensor data to identify at least one feature in the image as corresponding to an object in the operating environment of the vehicle and assign a score for the at least one feature based upon one of an identification of the object, a location of the object or a behavior of the object. The computerized perception device is further operable to define a plurality of candidate regions of interest upon the image, wherein each of the plurality of candidate regions of interest includes a portion of the image, and, for each of the plurality of candidate regions of interest, correlate the score for the at least one feature to the plurality of candidate regions of interest to accrue a total region score. The computerized perception device is further operable to select a portion of the plurality of candidate regions of interest for analysis based upon the total region score for each of the plurality of candidate regions of interest and analyze the portion of the plurality of candidate regions of interest to generate a path of travel output. The system further includes a vehicle control device receiving the path of travel output and controlling the vehicle based upon the path of travel output.

In some embodiments, analyzing the sensor data includes analyzing data from a plurality of sources. Assigning the score includes summing scores generated by analyzing the data from the plurality of sources.

In some embodiments, analyzing the sensor data includes analyzing data through a plurality of processes. Assigning the score includes summing scores generated by analyzing the data through the plurality of processes.

In some embodiments, the plurality of processes includes at least one of a maneuver analysis process, wherein an entered navigational route for the vehicle is utilized to identify a road surface in the operating environment, a map analysis process including utilizing a location of the vehicle and three-dimensional map data to determine a geometry of the road surface in the operating environment, or an object identification process. In some embodiments, the plurality of processes includes at least one of a salient feature process, or a depth variance process operable to determine a relative position of a first identified object to a second identified object.

In some embodiments, the sensor data is the image from the camera device.

In some embodiments, the sensor data is a light detection and ranging data map provided by a light detection and ranging device.

In some embodiments, analyzing the sensor data includes utilizing a maneuver analysis process, wherein an entered navigational route for the vehicle is utilized to identify a road surface.

In some embodiments, analyzing the sensor data includes utilizing a map analysis process including utilizing a location of the vehicle and three-dimensional map data to determine a geometry of a road surface in the operating environment.

In some embodiments, analyzing the sensor data includes utilizing an object identification process.

In some embodiments, analyzing the sensor data includes utilizing a scene parsing ambiguity process applying context to identify an object in the operating environment.

In some embodiments, analyzing the sensor data includes utilizing a salient feature process to determine the score for the at least one feature.

In some embodiments, analyzing the sensor data includes a depth variance process operable to determine a relative position of a first identified object to a second identified object.

In some embodiments, the behavior of the object includes one of trajectory of the object or a contextual risk related to the object.

In some embodiments, the vehicle control device includes an autonomous navigation device operable to control navigation of the vehicle based upon the path of travel output.

In some embodiments, the vehicle control device includes an object warning device operable to warn an occupant of the vehicle of presence of the object in the operating environment.

According to one alternative embodiment, a system for an attention-based perception in a vehicle is provided. The system includes a camera device configured to provide an image of an operating environment of the vehicle. The system further includes a computerized perception device operable to monitor the image from the camera device and analyze sensor data through a plurality of processes to identify at least one feature in the image as corresponding to an object in the operating environment of the vehicle and assign a score for the at least one feature based upon one of an identification of the object, a location of the object or a behavior of the object. Assigning the score includes summing scores generated by analyzing the data through the plurality of processes. The plurality of processes may include at least one of a maneuver analysis process, wherein an entered navigational route for the vehicle is utilized to identify a road surface in the operating environment, a map analysis process including utilizing a location of the vehicle and three-dimensional map data to determine a geometry of the road surface in the operating environment, or an object identification process. The plurality of processes may additionally or alternatively include a salient feature process or a depth variance process operable to determine a relative position of a first identified object to a second identified object. The computerized perception device is further operable to define a plurality of candidate regions of interest upon the image, wherein each of the plurality of regions of interest includes a portion of the image, and, for each of the plurality of candidate regions of interest, correlate the score for the at least one feature to the plurality of candidate regions of interest to accrue a total region score. The computerized perception device is further operable to select a portion of the plurality of candidate regions of interest for analysis based upon the total region score for each of the plurality of candidate regions of interest and analyze the portion of the plurality of candidate regions of interest to generate a path of travel output. The system further includes an autonomous navigation device receiving the path of travel output and controlling navigation of the vehicle based upon the path of travel output.

In some embodiments, analyzing the sensor data includes analyzing data from a plurality of sources.

According to one alternative embodiment, a method for an attention-based perception in a vehicle is provided. The method includes utilizing a camera device configured to provide an image of an operating environment of the vehicle to provide the image. The method further includes, within a computerized perception device, monitoring the image, analyzing sensor data to identify at least one feature in the image as corresponding to an object in the operating environment of the vehicle and assign a score for the at least one feature based upon one of an identification of the object, a location of the object or a behavior of the object, and defining a plurality of candidate regions of interest upon the image, wherein each of the plurality of regions of interest includes a portion of the image. The method further includes, within the computerized perception device, for each of the plurality of candidate regions, correlating the score for the at least one feature to the plurality of candidate regions of interest to accrue a total region score and selecting a portion of the plurality of candidate regions for analysis based upon the total region score for each of the plurality of candidate regions. The method further includes, within the computerized perception device, analyzing the portion of the plurality of candidate regions to generate a path of travel output. The method further includes operating a vehicle control device receiving the path of travel output and controlling the vehicle based upon the path of travel output.

In some embodiments, analyzing the sensor data includes analyzing sensor data from a plurality of sources. Assigning the score includes summing a plurality of scores generated by analyzing the data from the plurality of sources.

In some embodiments, analyzing the sensor data includes analyzing data through a plurality of processes. Assigning the score includes summing a plurality of scores generated by analyzing the data through the plurality of processes.

The above features and advantages and other features and advantages of the present disclosure are readily apparent from the following detailed description of the best modes for carrying out the disclosure when taken in connection with the accompanying drawings.

DETAILED DESCRIPTION

Figure 1:
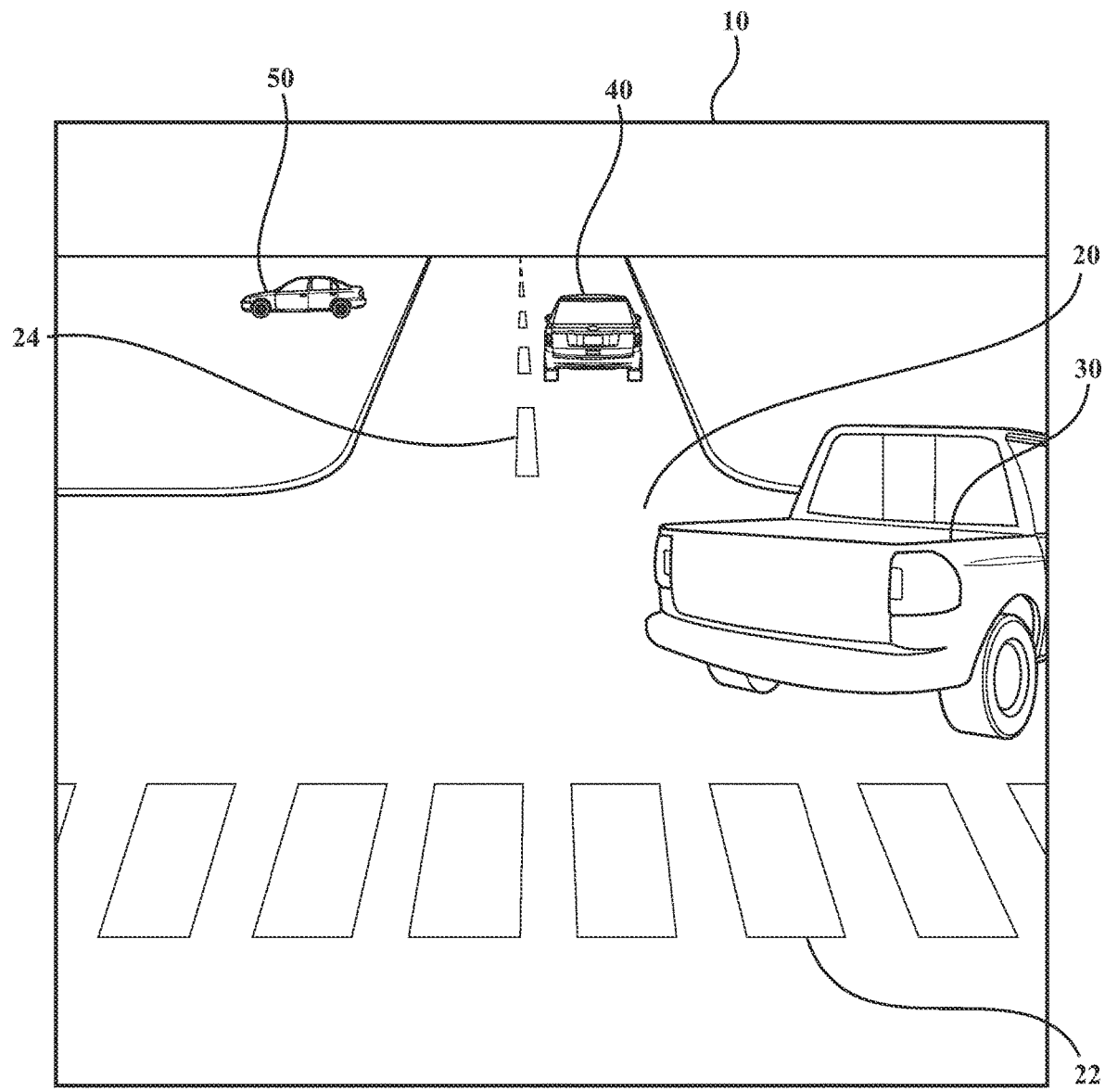
FIG. 1 schematically illustrates an exemplary image captured by a vehicle operating a computerized perception device, in accordance with the present disclosure.

A system and method for region of interest window generation for attention-based perception is provided. In computerized systems, computing resources or a capacity of a computerized processor or processors to make determinations may be a scarce resource. The allocation of computing resources may determine how accurately the system perceives objects in an environment of the vehicle. If the system indiscriminately uses resources to analyze pixels in a stream of images, the system may perceive objects less accurately than if the system may focus upon one or more regions of interest in an image. By focusing computing resources upon the one or more regions of interest in the image, in depth and/or iterative analyses may be performed upon the regions of interest to provide excellent estimations of position, trajectory, and identity of each object in the image.

The vehicle may include a plurality of sensors providing multiple data streams and formats. For example, a camera device may provide a plurality of images each including pixels which may be used to identify an object. An estimated identity of the object and behavior of the object through multiple images may be used to analyze the object. In another example, a LIDAR sensor may provide a LIDAR data map or data map of the environment around the vehicle including data regarding an object. An estimated identity of the object and behavior of the object through multiple data cycles of the LIDAR device may be used to analyze the object. Behavior of the object may include a location of the object, a trajectory of the object, and contextual risk related to the object.

In addition to different physical sources of data such as a camera device and a LIDAR device, the streams of data may be subjected to a plurality of computerized processes to achieve identifications and estimations from the data. One exemplary computerized process is a maneuver analysis. Maneuver analysis may be utilized to identify within an image or LIDAR data map road surfaces upon which a vehicle may travel or is likely to travel. For example, if a navigation route is planned, and the vehicle is set to make a right-hand turn at an upcoming intersection according to the navigational route, data within the images or data map corresponding to a road surface corresponding to right hand turn may be identified and utilized. Confirmation of the expected road surface feature may be used to analyze a data stream.

In another exemplary computerized process, three-dimensional (3D) map data may be utilized to identify within an image or LIDAR data map a road surface upon which the vehicle may travel or is likely to travel. Location data, for example, as provided by cellular tower triangulation data, may be combined with a digital map database to provide a location of the vehicle, thereby enabling the system to access 3D map data related to the environment around the vehicle. This 3D map data may be utilized to identify within an image or LIDAR data map data corresponding to a road surface or road surface feature. Confirmation of the expected road surface feature may be utilized to analyze a data stream.

In another exemplary computerized process, data provided within a LIDAR data map may be used to identify features or an object within a LIDAR data map. For example, analysis of LIDAR data maps may utilize comparison from one sequential data map to a next data map to identify a moving object within the data. In another example, analysis of a LIDAR data map may utilize Doppler-effect analysis to identify moving objects. Similarly, data may be utilized from ultrasonic sensors, radar sensor devices, and other similar detection methods in the art.

In another exemplary computerized process, pixels within an image captured by a camera device may be processed with filters and through image recognition software to identify and classify objects within the image. Object classification may further segment images into different areas such as road surface, vehicles, buildings, pedestrians. Such an object classification process may or may not further including a subsequent scene parsing ambiguity process. In many situations, the object detection results may include inconsistence and not be capable of rectifying the segmented images into a unified scene, and this inconsistence may be resolved by analyzing additional details. Scene parsing ambiguity information can be used to identify an object or the region of interest in the image. Scene parsing may draw upon additional information such as 3D map data, logic rules, and other information to estimate locations and behavior of objects within a scene.

In another exemplary computerized process, a salience model or salient feature model may be utilized to identify features within an image or LIDAR data map. For example, an object estimated to be a vehicle upon an estimated roadway may be considered of higher importance than an object estimated to be a water hydrant located in a fixed position to a side of an estimated roadway. An object estimated to be a pedestrian crossing an estimated roadway may be considered of higher importance than an object estimated to be a pedestrian walking along a side of the estimated roadway upon an estimated sidewalk. An object estimated to be a vehicle traveling upon an estimated roadway in an opposite direction as the vehicle operating the perception system upon the same estimated roadway as the vehicle operating the perception system may be considered of higher importance than an object estimated to be a vehicle driving on an estimated roadway representing an overpass not connecting to the roadway upon which the vehicle operating the perception system is traveling. An object estimated to be a stop sign or an electronic traffic signal may be considered of higher importance than an object estimated to be a no parking sign. An object estimated to be a construction cone located upon an estimated roadway may be considered of higher importance than a similar construction cone located to a side of the estimated roadway.

In another exemplary computerized process, an image and/or a LIDAR data map may be analyzed to determine estimated depth variance in the data. For example, LIDAR data may provide shapes and ranges of objects which may be used to compare a distance of one or more objects to the LIDAR device. In another example, a first object and a second object in the data may be identified to be a first vehicle and a second vehicle, respectively. By comparing size information of the objects in the data, an estimation may be made that the first object is closer to the vehicle operating the perception system than the second object. In another analysis, in multiple cycles of data, the first object may be observed to pass in front of the second object, thereby enabling estimation that the first object is closer to the vehicle operating the perception system than the second object. In another example, context and perspective cues in the data may be utilized to estimate depth in an image or LIDAR data map, for example, with a roadway surface narrowing in the distance due to perspective being useful to estimate a depth of an estimated vehicle upon the distant roadway surface.

The above computerized processes are useful to analyze data provided related to an operating environment of the vehicle operating the perception system. An output from each of these computerized processes may be separately useful to determine which region or portion of an image from a camera device being analyzed is of increased importance. In one embodiment, a plurality of the outputs from the computerized processes may be used together to score candidate regions of interest in the image from the camera device being analyzed. Each of these outputs may be described as an attention signal.

Attention signals may be provided by multiple signal sources with different formats and importance. The disclosed system and method utilize a plurality of candidate regions of interest of an image and determined importance scores of each of the plurality of candidate regions of interest to focus computing resources upon portions of the image.

Each of the plurality of candidate regions of interest may include a sum of scores or importance scores provided by a plurality of importance signals. In one example, a feature in an image representing a stationary vehicle by a side of the road may receive a low score from a Doppler analysis due to the vehicle being parked and stationary. The feature representing the same vehicle may get a high score from a salient feature analysis, thereby offsetting the low score from the Doppler analysis. In another example, a feature in an image representing a pedestrian walking toward the roadway may get a low score due to the feature representing an object not yet in the roadway, and the same feature may get a high score resulting from a scene parsing ambiguity analysis determining that the pedestrian is moving toward the roadway. According to one embodiment of the disclosed system and method, the following expression, utilizing convolution of each candidate region of interest with weighting, may be utilized to sum scoring data for candidate regions of interest.

$$\operatorname*{argmax}_{w} \sum_{k=1}^{l} \sum_{m=1}^{w_m} \sum_{n=1}^{w_n} \alpha_i f_w(X)_{m,n,i} k_i(p_w \cdot f_w(X)_{m,n,i}) - \beta \log S_w \quad (1)$$

wherein:
$\alpha_i$ is the weighting for each channel
$k_i(p_w \cdot f_w(X)_{m,n,i})$ is Kernel weighting for each of the candidate regions of interest
$\beta \log S_w$ is a weight for window size
$S_{min} \leq S_w \leq S_{max}$
$X \in [0,1]^{r \times c \times l}$ is the region of interest masks with resolution r×c and l channels, each channel l represents a region of interest candidate source
$f_w(x)$ is the cropping function of x based on window w
$\kappa(\cdot)$ is the kernel function, e.g. radial basis function kernel and $p_w$ is the center of the window $w_m$ and $w_n$ are the width and height of the candidate window, respectively $S_w$ is the area of window w, $S_{min}$ and $S_{max}$ are the smallest and largest region of interest window area, respectively.

Efficiency of the system and method may be affected by a number of simplifications or estimations. $X \in [0,1]^{r \times c \times l}$ may in one embodiment be reduced to $X \in \{0,1\}^{r \times c \times l}$, i.e., wherein in Expression 1, X is defined as a real number between 0 and 1, a simplification may include X being assumed to be 0 or 1. Additionally, one may approximate $k(p_w \cdot f_w(X)_{m,n,i})$ with piecewise linear weights. Additionally, one may use the same kernel function for the channels. Additionally, one may use a bigger stride for convolution. Additionally, one may use windows with a specific aspect ratio or size. In one embodiment, use of the disclosed method and efficiency measures results in an improvement from 100% central processing unit usage at 0.2-0.5 frames per second (previous method analyzing the entire breath and height of the image) to 2% central processing unit usage at 30 frames per second (the disclosed method, utilizing the described efficiency measures.)

FIG. 1 schematically illustrates an exemplary image 10 captured by a vehicle operating a computerized perception device. The image 10 may be one of a sequence of images captured by a camera device of the vehicle, wherein the sequence of images is useful to identify, locate, and estimate behavior of objects in an operating environment of the vehicle. The image 10 includes a first vehicle 30 located upon roadway 20, a second vehicle 40 located upon roadway 20, a third vehicle 50 located nearby to roadway 20, and markings 22 and markings 24 upon roadway 20.

Figure 2:
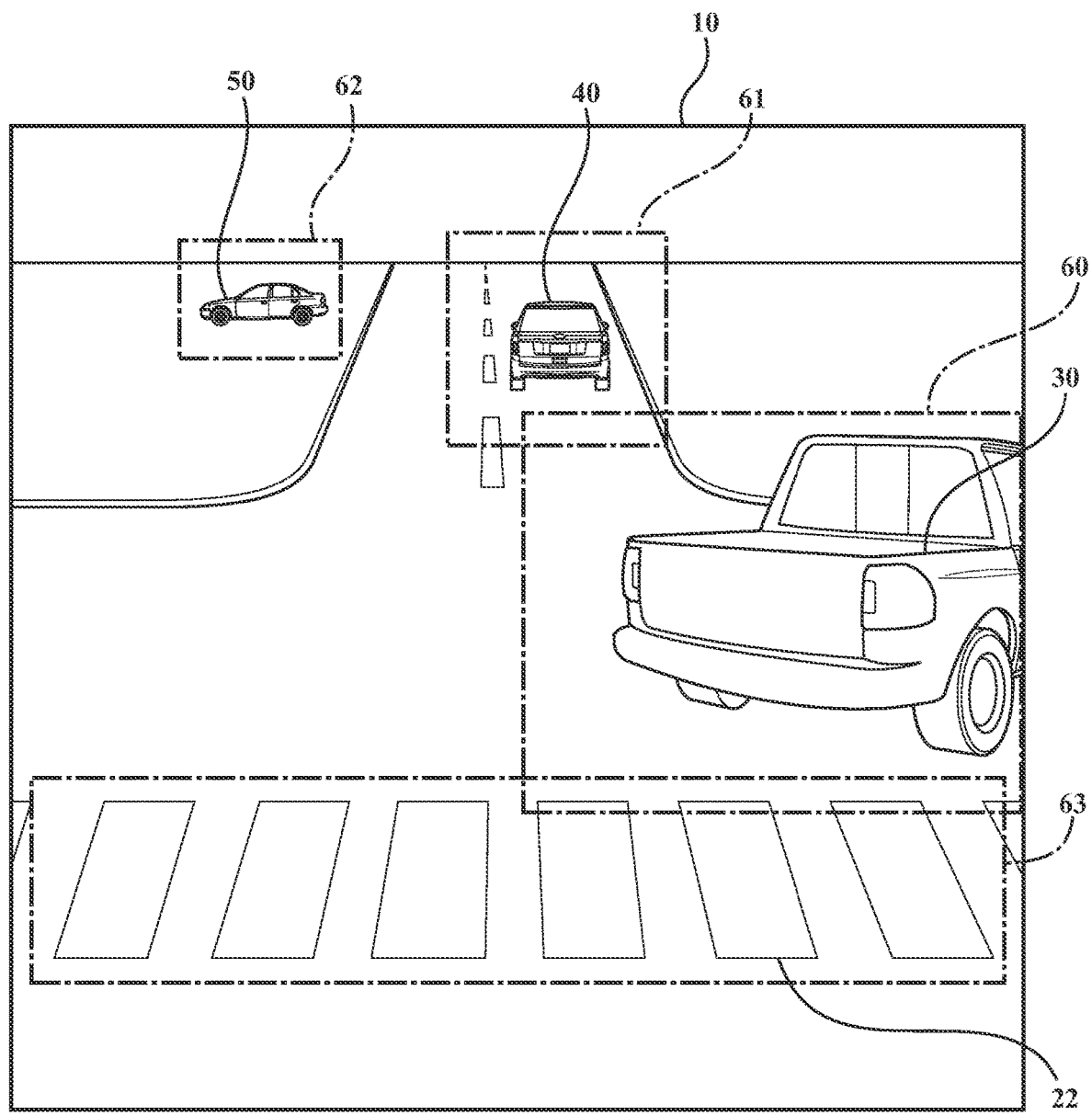
FIG. 2 schematically illustrates the image of FIG. 1, with a plurality of defined regions of interest in the image being utilized to focus computing resources upon particular areas of the image, in accordance with the present disclosure.

Analysis of an entirety of image 10 or analysis of an entirety of pixels of image 10 would expend computing resources on evaluating features unlikely to be useful to navigating the vehicle operating the perception system. The perception system may be more efficient or more accurate if it focuses computing resources on a portion or a particular region of the image 10 as compared to a system analyzing an entirety of the pixels of the image 10. FIG. 2 schematically illustrates the image 10, with a plurality of defined regions of interest in the image being utilized to focus computing resources upon particular areas of the image 10. A first region of interest 60 is defined including the first vehicle 30. A second region of interest 61 is defined including the second vehicle 40. A third region of interest 62 is defined including the third vehicle 50. A fourth region of interest 63 is defined including marking 22 upon the roadway. By defining the regions of interest, the perception system may focus computing resources upon the pixels in the regions of interest.

Figure 3:
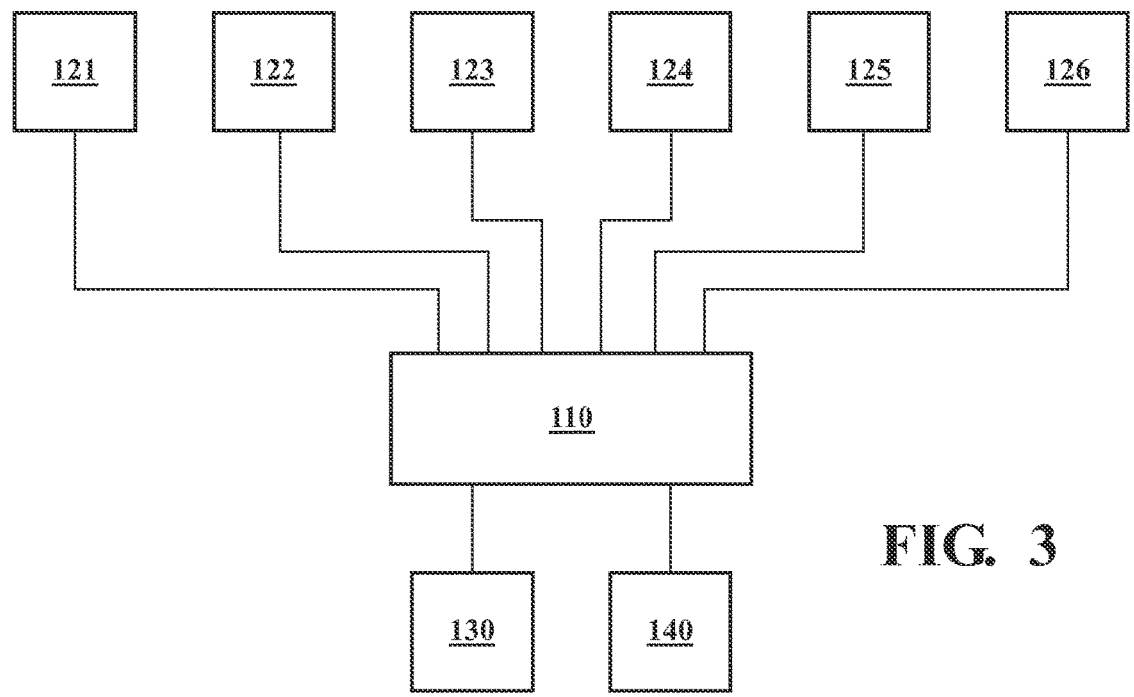
FIG. 3 schematically illustrates a system including a computerized perception device, six exemplary input analysis method modules, an autonomous navigation device, and an object warning device, in accordance with the present disclosure.

FIG. 3 schematically illustrates a system including a computerized perception device 110, six exemplary input analysis method modules, an autonomous navigation device 130, and an object warning device 140. The autonomous navigation device 130 and the object warning device 140 are provided as exemplary vehicle control devices useful to control the vehicle that may receive and act based upon a travel path output from the computerized perception device 110. The computerized perception device 110 is a computerized device including a processor, random-access memory (RAM), and a durable memory storage device. The computerized perception device 110 is operable to execute programming useful to analyze each of a sequence of images captured by a camera device and additionally to identify regions of interest in each of the sequence of images, enabling the analysis to focus upon the portions of the images or regions of interest in the images which are identified as including information with increased importance to navigating the vehicle and/or providing a warning indication to an occupant in the vehicle.

Module 121, module 122, module 123, module 124, module 125, and module 126 may represent computerized analysis of available data and may each provide an attention signal. Module 121, module 122, module 123, module 124, module 125, and module 126 are exemplary, operate a corresponding process, may exist as separate physical computerized devices, may be representative of computations performed or determinations made within a separate computerized device, or may be representative of computations performed or determinations made within the computerized perception device 110. Module 121 includes a maneuver analysis module, utilizing an entered navigational route to identify features in an image corresponding to anticipated details related to the entered navigational route. Module 122 includes a map analysis module, utilizing location data for the vehicle operating the computerized perception device 110 and a 3D map database to identify geographical details in an operating environment of the vehicle and identify features in an image corresponding to anticipated details provided by or retrieved from the 3D map database. Module 123 includes an object identification module, utilizing data from a sensor device, such as details identified in a LIDAR data map, to identify corresponding objects represented in an image. Module 124 includes a scene parsing ambiguity module, utilizing identified objects in the operating environment to establish estimated behaviors of the identified object and identify corresponding features in an image. Module 125 includes a salient feature module, utilizing data from one or more sensors to identify one or more salient features with increased importance in the operating environment and identify corresponding features in an image. Module 126 includes a depth variance module, utilizing data from one or more sensors to estimate depth or relative distance of identified objects or features in the operating environment and corresponding features in an image. Module 121, module 122, module 123, module 124, module 125, and module 126 may each provide data related to features visible within an image provided by camera device 210 to be analyzed by the computerized perception device, and that data provided by the modules may be used to assign scores to each a plurality of candidate regions of interest upon the image provided by camera device 210. Based upon a summation or compilation of the provided scores, a selected portion of the candidate regions of interest may be selected for analysis.

Based upon analysis of the regions of interest in the image provided by camera device 210, a path of travel output may be provided to the autonomous navigation device 130 and/or the object warning device 140. Such a path of travel output may include data useful to warn regarding an object affecting a planned path of the vehicle, may include data useful to determine a planned path of the vehicle, may include data useful to stop the vehicle or navigate the vehicle around an object.

Figure 4:
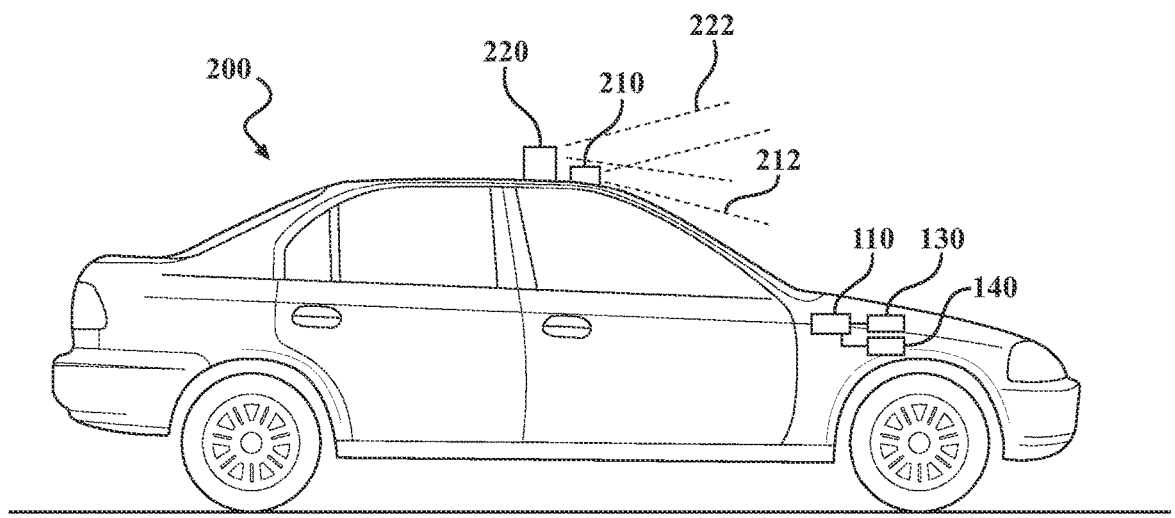
FIG. 4 schematically illustrates an exemplary vehicle including a computerized perception device, a light detection and ranging (LIDAR) device, and a camera device, in accordance with the present disclosure.

FIG. 4 schematically illustrates an exemplary vehicle 200 including a computerized perception device 110, a LIDAR device 220, and a camera device 210. The LIDAR device 220 includes a field of view 222, and the camera device 210 includes a field of view 212, wherein field of view 222 and field of view 212 may cover a same area in front of the vehicle 200. The computerized perception device 110 is illustrated in electronic communication with the autonomous navigation device 130 and the object warning device 140. The computerized perception device 110 may be in electronic communication with an electronic device within the vehicle 200 including the autonomous navigation device 130, the object warning device 140, the camera device 210, and the LIDAR device 220 through a communications bus device. The vehicle may include a wireless communications device additionally providing data and remote computational support through a wireless communication network and remote computerized server devices.

Figure 5:
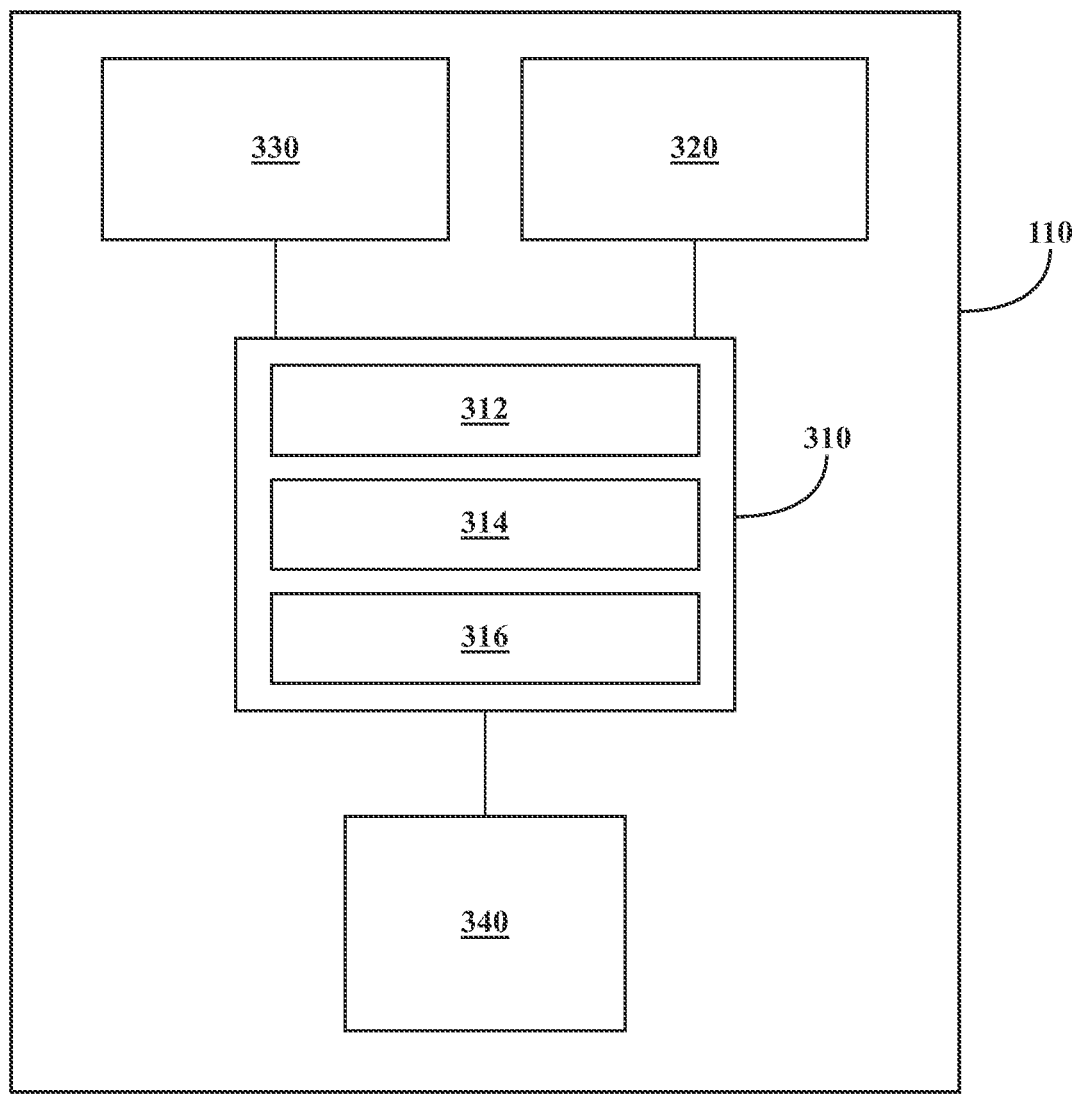
FIG. 5 schematically illustrates the computerized perception device, in accordance with the present disclosure.

FIG. 5 schematically illustrates the computerized perception device 110. Computerized perception device 110 includes processing device 310, communications device 320, data input output device 330, and memory storage device 340. It is noted that computerized perception device 110 may include other components and some of the components are not present in some embodiments.

The processing device 310 may include memory, e.g., read only memory (ROM) and random-access memory (RAM), storing processor-executable instructions and one or more processors that execute the processor-executable instructions. In embodiments where the processing device 310 includes two or more processors, the processors may operate in a parallel or distributed manner. Processing device 310 may execute the operating system of the computerized perception device 110. Processing device 310 may include one or more modules executing programmed code or computerized processes or methods including executable steps. Illustrated modules may include a single physical device or functionality spanning multiple physical devices. In the illustrative embodiment, the processing device 310 also includes an attention signal scoring module 312, a region of interest candidate and selection module 314, and an identified feature and object analysis and output module 316, which are described in greater detail below.

The data input output device 330 is a device that is operable to take data gathered from sensors and devices throughout the vehicle and process the data into formats readily usable by processing device 310. Data input output device 330 is further operable to process output from processing device 310 and enable use of that output by other devices or control modules throughout the vehicle.

The communications device 320 may include a communications/data connection with a bus device configured to transfer data to different components of the system and may include one or more wireless transceivers for performing wireless communication.

The memory storage device 340 is a device that stores data generated or received by the computerized perception device 110. The memory storage device 340 may include, but is not limited to, a hard disc drive, an optical disc drive, and/or a flash memory drive.

The attention signal scoring module 312 may collect data from modules providing attention signals and utilize scoring data related to the attention signals to provide scores to each of a plurality of candidate regions of interest for an image being analyzed. According to one embodiment, a score may be assigned to pixels or features upon the image being analyzed, and a region of interest including the pixels or features accrue a total region score from those pixels or features.

The region of interest candidate and selection module 314 receives scoring data from the attention signal scoring module 312. The region of interest candidate and selection module 314 may identify or define a plurality of candidate regions of interest upon the image being analyzed. These candidate regions of interest are correlated or associated with scores for pixels or features illustrated upon the image being analyzed, and total region scores are accrued for each of the plurality of candidate regions of interest. Regions of interest with higher total region scores may be selected for analysis. According to one embodiment, a selected number of regions of interest may be selected from an image being analyzed, for example, with one third of the candidate regions of interest being selected based upon a top third of the total region scores accrued. According to another embodiment, a threshold region score may be defined, and a region of interest with a total region score exceeding the threshold region score may be selected for analysis.

The identified feature and object analysis and output module 316 may utilize the selected regions of interest to analyze the image and determine information about features and objects in the selected regions of interest. The determined information may include identification and tracking information for moving objects such as other vehicles and pedestrians. The determined information may include analysis of lane markings and traffic signs or signals. The determined information may include road geometry such as lane locations, road curvature, intersection geometry, construction zone details, and other similar information. The identified feature and object analysis and output module 316 may provide electronic path of travel outputs to the autonomous navigation device 130 and/or the object warning device 140 of FIGS. 3 and 4.

Computerized perception device 110 is provided as an exemplary computerized device capable of executing programmed code to accomplish the methods and processes described herein. A number of different embodiments of computerized perception device 110, devices attached thereto, and modules operable therein are envisioned, and the disclosure is not intended to be limited to examples provided herein.

Figure 6:
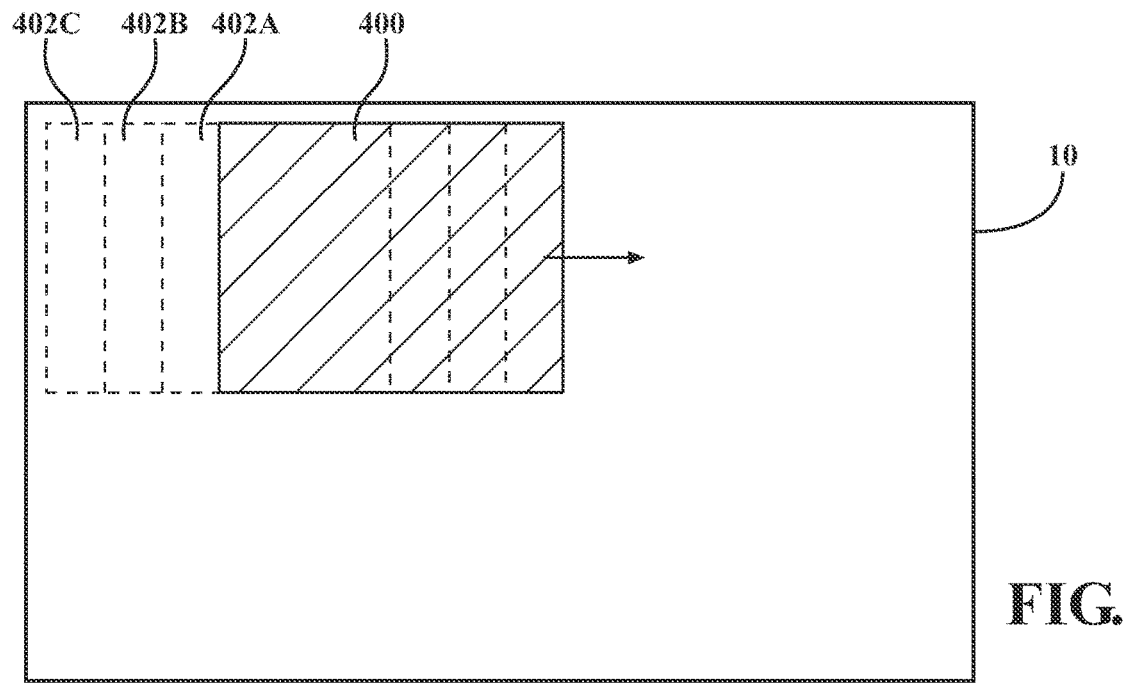
FIG. 6 schematically illustrates an image being analyzed by a series of candidate regions of interest each operable to examine a portion of the image, in accordance with the present disclosure.
Figure 7:
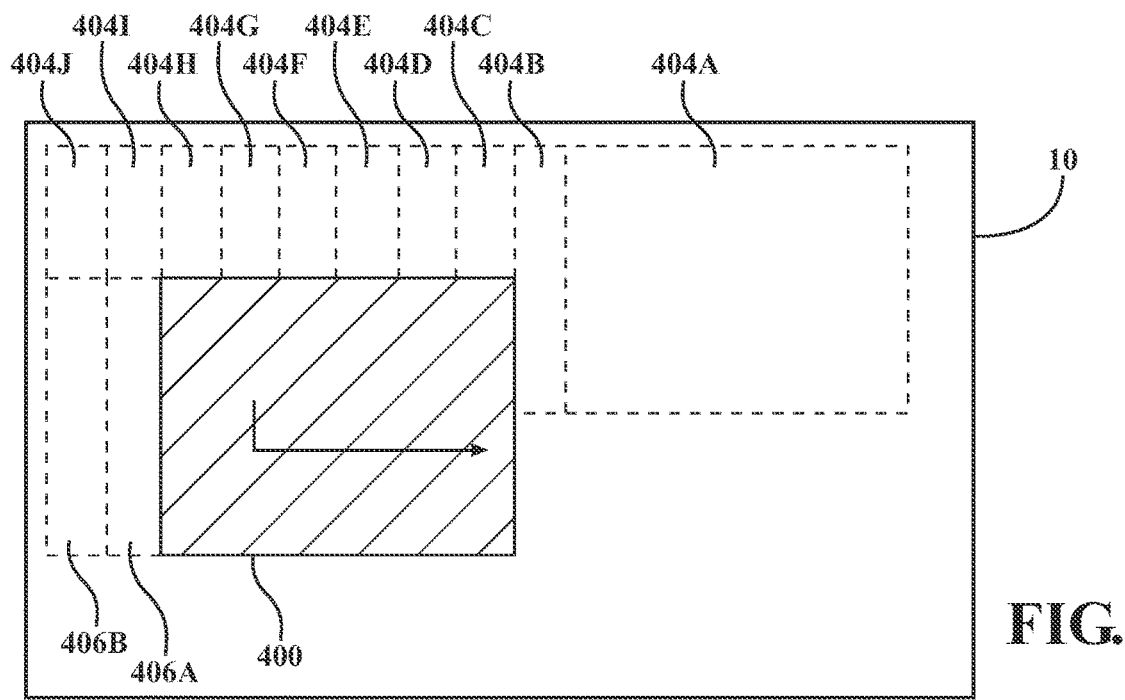
FIG. 7 schematically illustrates the image of FIG. 6 continuing to be analyzed with candidate regions of interest being generated across the image, in accordance with the present disclosure.

Candidate regions of interest may be different shapes and sizes. In one embodiment, a geometry of a road surface estimated in the operating environment may be utilized to tailor candidate regions of interest to the particular road surface and where objects are most likely to be detected upon the road surface. In another embodiment, in order to conserve computational resources, candidate regions of interest may be provided with a uniform shape and size, with the candidate regions of interest being uniformly spread over the image being analyzed. FIG. 6 schematically illustrates an image 10 being analyzed by a series of candidate regions of interest each operable to examine a portion of the image 10. A most recently defined candidate region of interest 400 is illustrated, with previously defined candidate regions of interest 402A, 402B, and 402C being illustrated with dashed lines. Each of the candidate regions of interest are a same size and shape. An arrow is illustrated upon image 10 showing how subsequent candidate regions of interest will be defined horizontally along the image 10. FIG. 7 schematically illustrates the image 10 of FIG. 6 continuing to be analyzed with candidate regions of interest being generated across the image 10. An entire horizontal row of uniformly shaped and sized, rectangular, candidate regions of interest 404A, 404B, 404C, 404D, 404E, 404F, 404G, 404H, 404I, and 404J are defined horizontally progressing along the image 10, such that an entire width of the image 10 is covered with the candidate regions of interest. An arrow is provided, illustrating definition of a second horizontal row including a most recently defined region of interest 400 and previously defined regions of interest 406A and 406B. This process may be repeated, until an entirety of the image 10 is covered with candidate regions of interest.

Figure 8:
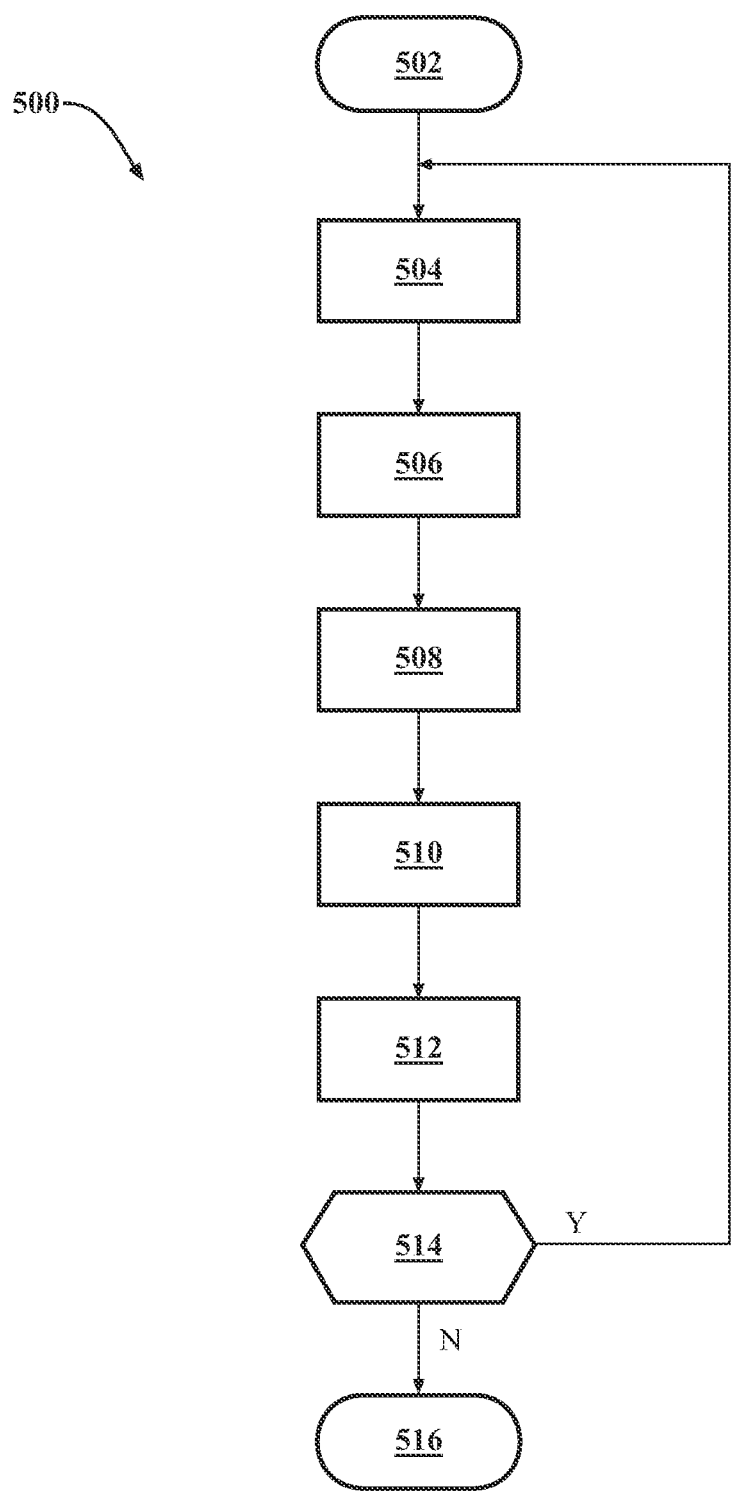
FIG. 8 is a flowchart illustrating a method to analyze an image using a plurality of candidate regions of interest, in accordance with the present disclosure.

FIG. 8 is a flowchart illustrating a computerized method 500 to analyze an image using a plurality of candidate regions of interest. The method 500 starts at step 502. At step 504, data related to an operating environment of a vehicle operating the method 500 is collected. The data may include an image collected by a camera device, a data map collected by a LIDAR device, or other similar sensor data. The data may include an image to be analyzed. At step 506, the data is analyzed, and one or more attention signals are generated. The attention signals may include scoring data provided by a maneuver analysis process, a map analysis process, and/or an object identification process. The attention signals may additionally or alternatively include scoring data provided by a scene parsing ambiguity process, a salient feature process, and/or a depth variance process. At step 508, a plurality of candidate regions of interest are defined for the image to be analyzed, scoring data related to the attention signal or signals is correlated to the plurality of candidate regions of interest, and some portion of the candidate regions of interest are selected for analysis. At step 510, the selected regions of interest are analyzed, and an output related to at least one feature or object detected in the operating environment of the vehicle is generated. At step 512, the output from step 510 is utilized to control the vehicle. At step 514, a determination is made whether analysis of an additional image is useful to operate the vehicle. If the analysis of the additional image is determined to be useful, the method returns to step 504 to reiterate the analysis upon a new image. If the analysis of the additional image is determined not to be useful, the method advances to step 516, where method 500 ends. The method 500 illustrated is provided as an exemplary method. A number of additional and/or alternative method steps are envisioned, and the disclosure is not intended to be limited to the specific examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for an attention-based perception in a vehicle, comprising:
    a camera device configured to provide an image of an operating environment of the vehicle;
    a computerized perception device, operable to:
        monitor the image from the camera device;
        analyze sensor data to identify at least one feature in the image as corresponding to an object in the operating environment of the vehicle and assign a score for the at least one feature based upon one of an identification of the object, a location of the object or a behavior of the object;
        define a plurality of candidate regions of interest upon the image, wherein each of the plurality of candidate regions of interest includes a portion of the image;
        for each of the plurality of candidate regions of interest, correlate the score for the at least one feature to the plurality of candidate regions of interest to accrue a total region score;
        select a portion of the plurality of candidate regions of interest for analysis based upon the total region score for each of the plurality of candidate regions of interest; and
        analyze the portion of the plurality of candidate regions of interest to generate a path of travel output; and
    a vehicle control device receiving the path of travel output and controlling the vehicle based upon the path of travel output.

2. The system of claim 1, wherein analyzing the sensor data includes analyzing data from a plurality of sources; and
    wherein assigning the score includes summing a plurality of scores generated by analyzing the data from the plurality of sources.

3. The system of claim 1, wherein analyzing the sensor data includes analyzing data through a plurality of processes; and
    wherein assigning the score includes summing a plurality of scores generated by analyzing the data through the plurality of processes.

4. The system of claim 3, wherein the plurality of processes include at least one of a maneuver analysis process, wherein an entered navigational route for the vehicle is utilized to identify a road surface in the operating environment, a map analysis process including utilizing a location of the vehicle and three-dimensional map data to determine a geometry of the road surface in the operating environment, an object identification process, a salient feature process, or a depth variance process operable to determine a relative position of a first identified object to a second identified object.

5. The system of claim 1, wherein the sensor data is the image from the camera device.

6. The system of claim 1, wherein the sensor data is a light detection and ranging data map provided by a light detection and ranging device.

7. The system of claim 1, wherein analyzing the sensor data includes utilizing a maneuver analysis process, wherein an entered navigational route for the vehicle is utilized to identify a road surface.

8. The system of claim 1, wherein analyzing the sensor data includes utilizing a map analysis process including utilizing a location of the vehicle and three-dimensional map data to determine a geometry of a road surface in the operating environment.

9. The system of claim 1, wherein analyzing the sensor data includes utilizing an object identification process.

10. The system of claim 9, wherein analyzing the sensor data includes utilizing a scene parsing ambiguity process applying context to identify an object in the operating environment.

11. The system of claim 1, wherein analyzing the sensor data includes utilizing a salient feature process to determine the score for the at least one feature.

12. The system of claim 1, wherein analyzing the sensor data includes a depth variance process operable to determine a relative position of a first identified object to a second identified object.

13. The system of claim 1, wherein the behavior of the object includes one of trajectory of the object or a contextual risk related to the object.

14. The system of claim 1, wherein the vehicle control device includes an autonomous navigation device operable to control navigation of the vehicle based upon the path of travel output.

15. The system of claim 1, wherein the vehicle control device includes an object warning device operable to warn an occupant of the vehicle of a presence of the object in the operating environment.

16. A system for an attention-based perception in a vehicle, comprising:
- a camera device configured to provide an image of an operating environment of the vehicle;
- a computerized perception device, operable to:
  - monitor the image from the camera device;
  - analyze sensor data through a plurality of processes to identify at least one feature in the image as corresponding to an object in the operating environment of the vehicle and assign a score for the at least one feature based upon one of an identification of the object, a location of the object or a behavior of the object, wherein assigning the score includes summing a plurality of scores generated by analyzing the sensor data through the plurality of processes, and wherein the plurality of processes include at least one of:
    - a maneuver analysis process, wherein an entered navigational route for the vehicle is utilized to identify a road surface in the operating environment,
    - a map analysis process including utilizing a location of the vehicle and three-dimensional map data to determine a geometry of the road surface in the operating environment,
    - an object identification process,
    - a salient feature process, or
    - a depth variance process operable to determine a relative position of a first identified object to a second identified object;
  - define a plurality of candidate regions of interest upon the image, wherein each of the plurality of candidate regions of interest includes a portion of the image;
  - for each of the plurality of candidate regions of interest, correlate the score for the at least one feature to the plurality of candidate regions of interest to accrue a total region score;
  - select a portion of the plurality of candidate regions of interest for analysis based upon the total region score for each of the plurality of candidate regions of interest; and
  - analyze the portion of the plurality of candidate regions of interest to generate a path of travel output; and
- an autonomous navigation device receiving the path of travel output and controlling navigation of the vehicle based upon the path of travel output.

17. The system of claim 16, wherein analyzing the sensor data includes analyzing data from a plurality of sources.

18. A method for an attention-based perception in a vehicle, comprising:
- utilizing a camera device configured to provide an image of an operating environment of the vehicle to provide the image;
- within a computerized perception device,
  - monitoring the image;
  - analyzing sensor data to identify at least one feature in the image as corresponding to an object in the operating environment of the vehicle and assign a score for the at least one feature based upon one of an identification of the object, a location of the object or a behavior of the object;
  - defining a plurality of candidate regions of interest upon the image, wherein each of the plurality of candidate regions of interest includes a portion of the image;
  - for each of the plurality of candidate regions of interest, correlating the score for the at least one feature to the plurality of candidate regions of interest to accrue a total region score;
  - selecting a portion of the plurality of candidate regions of interest for analysis based upon the total region score for each of the plurality of candidate regions of interest; and
  - analyzing the portion of the plurality of candidate regions of interest to generate a path of travel output; and
- operating a vehicle control device receiving the path of travel output and controlling the vehicle based upon the path of travel output.

19. The method of claim 18, wherein analyzing the sensor data includes analyzing sensor data from a plurality of sources; and
wherein assigning the score includes summing a plurality of scores generated by analyzing the data from the plurality of sources.

20. The method of claim 18, wherein analyzing the sensor data includes analyzing data through a plurality of processes; and
wherein assigning the score includes summing a plurality of scores generated by analyzing the data through the plurality of processes.

* * * * *